US008806280B2

(12) United States Patent
Stephenson et al.

(10) Patent No.: US 8,806,280 B2
(45) Date of Patent: Aug. 12, 2014

(54) APIS TO TEST A DEVICE

(75) Inventors: Alan W. Stephenson, Seattle, WA (US); Xiao Tu, Sammamish, WA (US); Scott S. Sheehan, Redmond, WA (US); Robert K. Mickle, Seattle, WA (US); Changsin Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 13/405,737

(22) Filed: Feb. 27, 2012

(65) Prior Publication Data

US 2013/0227348 A1 Aug. 29, 2013

(51) Int. Cl.
*G06F 11/00* (2006.01)

(52) U.S. Cl.
USPC .............................. 714/38.1; 714/25; 715/702

(58) Field of Classification Search
USPC .................... 714/1, 2, 25, 27, 38.1; 345/174; 717/124, 125; 715/702
See application file for complete search history.

(56) References Cited

U.S. PATENT DOCUMENTS

| | | | | |
|---|---|---|---|---|
| 7,437,715 | B2 * | 10/2008 | Chatsinchai et al. | 717/127 |
| 8,009,138 | B2 | 8/2011 | Yasutake | |
| 8,312,479 | B2 * | 11/2012 | Boillot | 719/328 |
| 2003/0156756 | A1 | 8/2003 | Gokturk et al. | |
| 2005/0268173 | A1 * | 12/2005 | Kudukoli et al. | 714/38 |
| 2009/0055019 | A1 | 2/2009 | Stiehl et al. | |
| 2009/0278915 | A1 | 11/2009 | Kramer et al. | |
| 2010/0103106 | A1 | 4/2010 | Chui | |
| 2012/0092286 | A1 * | 4/2012 | O'Prey et al. | 345/174 |
| 2012/0146956 | A1 * | 6/2012 | Jenkinson | 345/178 |
| 2012/0280934 | A1 * | 11/2012 | Ha et al. | 345/174 |

OTHER PUBLICATIONS

Jia, et al., "Development of Service Robot System with Multiple Human User Interface", Retreived at <<http://www.intechopen.com/source/pdfs/588/InTech-Development_of_service_robot_system_with_multiple_human_user_interface.pdf>>, Sep. 2007, pp. 139-156.

(Continued)

*Primary Examiner* — Yolanda L Wilson
(74) *Attorney, Agent, or Firm* — Tony Azure; Andrew Sanders; Micky Minhas

(57) ABSTRACT

APIs to test a device are described. In one or more implementations, a device includes a housing, one or more sensors supported by the housing, and one or more modules disposed within the housing that are implemented at least partially in hardware. The one or more modules are configured to process inputs detected using the one or more sensors and expose one or more application programming interfaces to a robot to cause the robot to perform one or more operations that are detectable by the one or more sensors, the one or more operations usable to test detection performed by the one or more sensors and the processing of the inputs performed by the one or more modules.

20 Claims, 6 Drawing Sheets

(56) References Cited

OTHER PUBLICATIONS

Saleiro, et al., "Automatic Hand or Head Gesture Interface for Individuals with Motor Impairments, Senior Citizens and Young Children", Retrieved at <<http://w3.ualg.pt/~jrodrig/papers_pdf/DSAI2009.pdf>>, Proceedings of Software Development for Enhancing Accessibility and Fighting Info-exclusion, Jun. 3, 2009, pp. 165-171.

Hilbert, et al., "Extracting Usability Information from User Interface Events", Retrieved at <<http://www.fxpal.com/publications/FXPAL-PR-00-162.pdf>>., Proceedings of ACM Computing Surveys, vol. 32, No. 4, Dec. 2000, pp. 384-421.

Arbeiter, Georg, "Multi-Role Shadow Robotic System for Independent Living", Retrieved at <<http://srs-project.eu/sites/default/files/SRS_247772_D1.2A_Technology%20Assessment.pdf>>, Feb. 1, 2010, pp. 1-133.

Liu, et al., "An Adaptive User Interface Based on Personalized Learning", Retrieved at http://ieeexplore.ieee.org/stamp/stamp.jsp?tp=&arnumber=1193657>>, Proceedings: Published by the IEEE Computer Society, vol. 18, Issue 2>>, Mar. 2003, pp. 52-57.

* cited by examiner

APIS TO TEST A DEVICE

BACKGROUND

Display and input techniques utilized by computing devices are ever evolving. For example, initial computing devices were provided with monitors. A user interacted with the computing device by viewing simple text on the monochrome monitor and entering text via a keyboard that could then be viewed on the monitor. Other techniques were then subsequently developed, such as graphical user interfaces and cursor control devices.

Display and input techniques have continued to evolve, such as to sense touch using a touchscreen display of a computing device to recognize gestures. A user, for instance, may interact with a graphical user interface by inputting a gesture using the user's hand that is detected by the touchscreen display or other touch-sensitive device. However, traditional techniques that were utilized to test touchscreen displays and other touch-sensitive devices were often inaccurate and therefore were typically inadequate to test the touchscreen displays as suitable for intended use of the device.

SUMMARY

APIs to test a device are described. In one or more implementations, a device includes a housing, one or more sensors supported by the housing, and one or more modules disposed within the housing that are implemented at least partially in hardware. The one or more modules are configured to process inputs detected using the one or more sensors and expose one or more application programming interfaces to a robot to cause the robot to perform one or more operations that are detectable by the one or more sensors, the one or more operations usable to test detection performed by the one or more sensors and the processing of the inputs performed by the one or more modules.

In one or more implementations, one or more application programming interfaces are exposed by a device under test to a robot to cause a robot to perform one or more operations. The one or more operations performed by the robot are detected using one or more sensors of the device under test. An ability of the device under test is tested to process inputs received from the one or more sensors of the device under test.

In one or more implementations, a system includes a robot configured to perform one or more operations and a device under test having a touchscreen and one or more modules that are implemented at least partially in hardware. The one or more modules are configured to expose one or more application programming interfaces to the robot to cause the robot to perform one or more operations that are detectable by the device under test using the touchscreen and test an ability of the one or more modules to process inputs received from the touchscreen to recognize a gesture that is usable to initiate a function of the device under test.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that were utilized to test devices could be complicated. Further, different techniques performed by different testers could result in inconsistencies, such as to determine whether the device is configured to operate as desired.

APIs to test a device are described. In one or more implementations, a device under test exposes application programming interfaces (APIs) to a robot to cause the robot to perform operations that are detectable by the device, such as through use of one or more sensors of a touchscreen of the device. A variety of different testing may be performed through use of the robot, such as to test accuracy, latency, and so forth. Thus, the device under test may support consistency in tests that are performed on the device, further discussion of which may be found in relation to the following sections.

In the following discussion, an example environment is first described that may employ the panning latency measurement techniques described herein. Example procedures are then described which may be performed in the example environment as well as other environments. Consequently, performance of the example procedures is not limited to the example environment and the example environment is not limited to performance of the example procedures.

Example Environment

Figure 1:
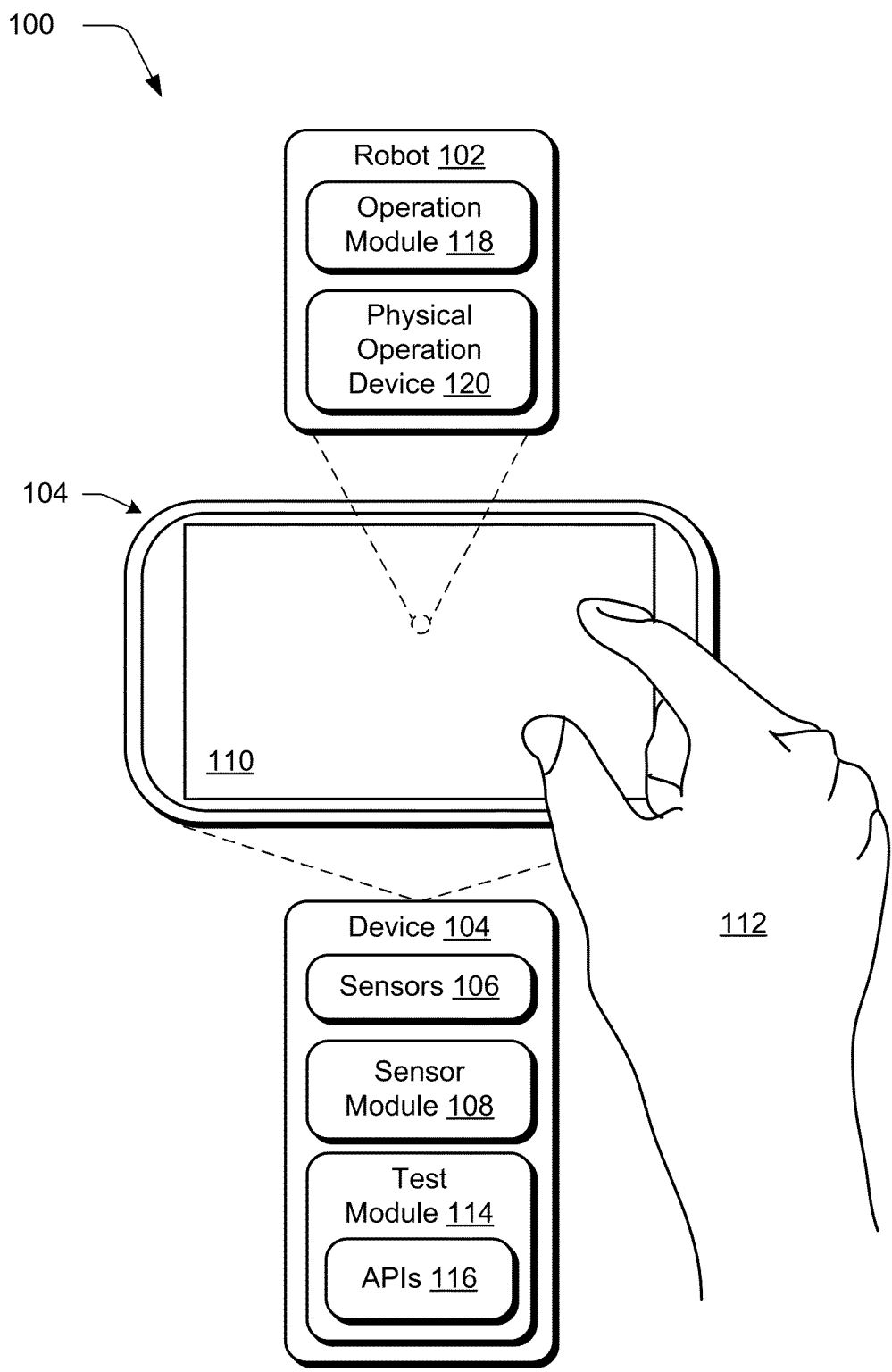
FIG. 1 is an illustration of an environment in an example implementation that is suitable to test a device.

FIG. 1 depicts an environment 100 in an example implementation that includes a robot 102 and a device under test, an example of which is referred to as device 104 in the following discussion. The device 104 may be configured in a variety of ways. For example, the device 104 may be configured to include a housing formed for use in a handheld form factor as illustrated. Examples of such a form factor include as part of a mobile communication device such as a mobile phone, a portable game-playing device, a tablet computer, and so on. Other form factors are also contemplated, such as part of a traditional computing device (e.g., touchpad or monitor) and so on as further described in relation to FIG. 6.

In the illustrated example, the device 104 includes one or more sensors 106 and a sensor module 108. The sensor module 108 is configured to process inputs detected using the sensors 106. As the device 104 may be configured in a variety of ways, the sensors 106 may also be configured in a variety of ways. For example, the sensors 106 may be configured as part of a display device 110 of the device 104, such as to form a touchscreen. Accordingly, the sensors 106 may be configured to detect proximity (e.g., contact) with the display device 110, such as proximity of one or more fingers of a user's hand 112 to the sensors 106. Sensors 106 are typically used to report actual contact with the sensors 106 of the display device 110, such as when being touched with a finger of a user's hand 112, although other sensors are also described.

Examples of such sensors 106 include capacitive touch sensors. For instance, in projected capacitance an X-Y grid may be formed across a surface of the display device 110 using near optically transparent conductors (e.g., indium tin oxide) to detect contact at different X-Y locations on the display device 110. Other capacitance techniques are also contemplated, such as surface capacitance, mutual capacitance, self-capacitance, and so on. Further, other sensors 106 are also contemplated in other instances, such as infrared, optical imaging, dispersive signal technology, acoustic pulse recognition, resistive sensors (e.g., detect pressure), sensor in a pixel, and so on. Thus, the sensors 106 may be configured to detect proximity and not actual physical contact, e.g., "hovering" of a stylus or other object.

Regardless of the type of sensors 106 used, inputs detected by the sensors 106 may then be processed by the sensor module 108 to detect characteristics of the inputs, which may be used for a variety of purposes. For example, the sensor module 108 may recognize that the input indicates selection of a particular object, may recognize one or more inputs as a gesture usable to initiate an operation of the device 104 (e.g., navigate through a user interface), and so forth. However, this processing may rely upon the accuracy of the inputs and therefore conventional techniques that were utilized to test the device 104, and more particularity the sensors 106 and sensor module 108, could result in an inaccurate testing and therefore inconsistencies between devices, which could also lead to an inconsistent user experience.

In one or more implementations described herein, the device 104 includes test module 114. The test module 114, for instance, may be configured as a stand-alone module, as part of an operating system installed on the device 104, and so on. The test module 114 is representative of functionality to cause a test to be performed to test functions of the device 104. The test module 114, for instance, may include one or more application programming interfaces (APIs) 116 that are exposed to the robot 102 to cause the robot to perform one or more operations.

The robot 102, for instance, is illustrated as including an operation module 118 and a physical operation device 120. The operation module 118 is representative of functionality of the robot 102 to cause the physical operation device 120 to perform one or more operations. The physical operation device 120, for instance, may be configured as a robotic arm, include a step motor, and so on that is configured to engage in physical movement that is detectable using the one or more sensors 106.

The test module 114 may expose commands and other data via the APIs 116 to cause the operation module 118 of the robot 102 to move the physical operation device 120 to test the device 104 as desired, and therefore may be made extensible to a variety of different types of robots to perform the test. Thus, inclusion of the test module 114 on the device 104 may be employed to support consistent testing of the device 104. Although the test module 114 is illustrated as included on the device 104, however, it should be readily apparent that the test module 114 may be implemented on a variety of other devices, such as a computing device that is communicatively coupled to the robot 102 and/or device 104, by the robot 102, and so on. An example of testing performed using the robot 102 and device 104 may be found beginning in relation to the following figure.

Figure 2:
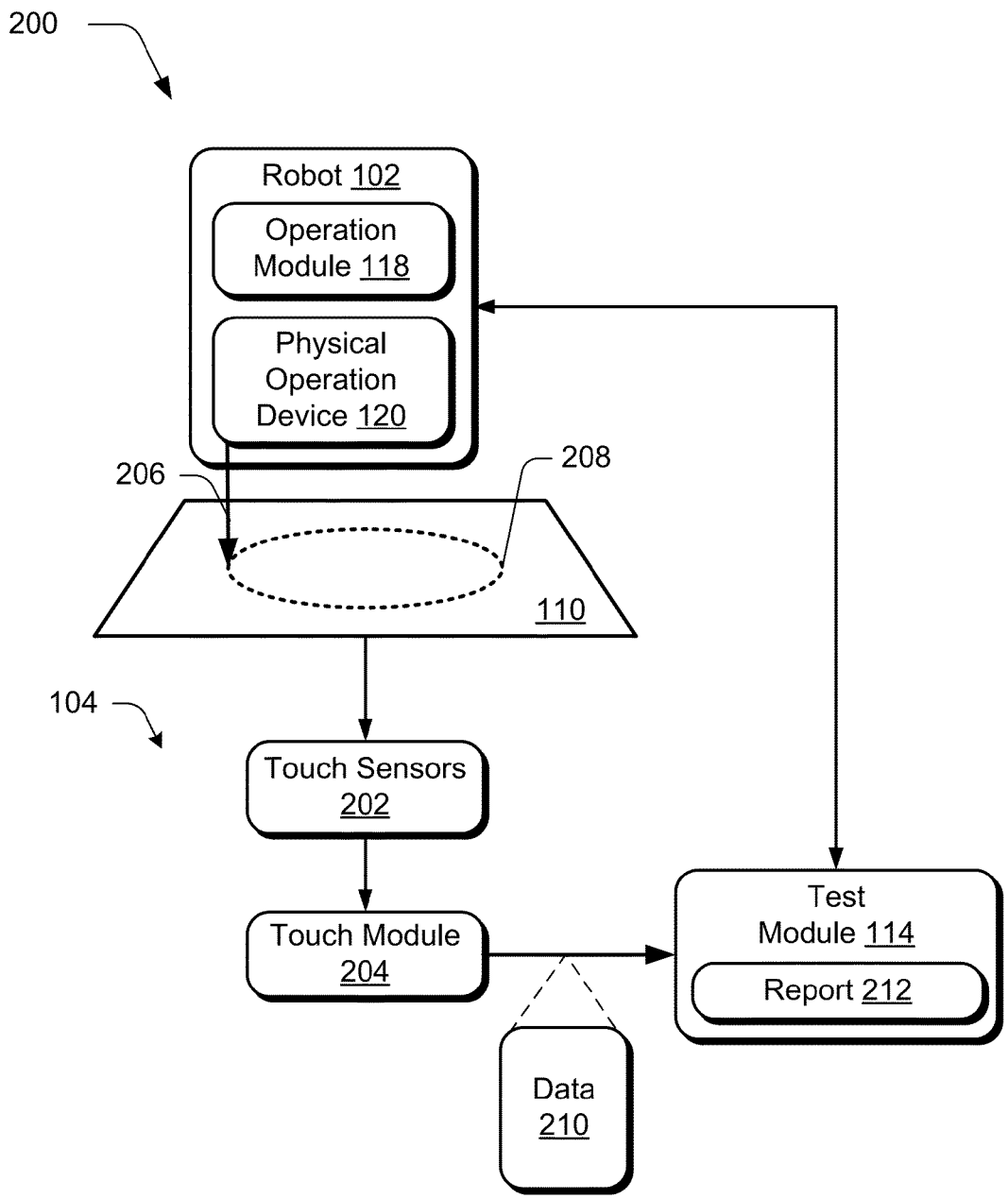
FIG. 2 depicts a system in an example implementation in which a device under test of FIG. 1 is configured as a touchscreen device and tested through use of a robot.

FIG. 2 depicts a system 200 in an example implementation in which the device 102 of FIG. 1 is configured as a touchscreen device (e.g., having touch sensors 202 and a touch module 204) and tested through use of the robot 102. The robot 102 includes an operation module 118 and a physical operation device 120 as previously described. The physical operation device 120 includes a contact 206. As previously stated, the contact 206 may be detected by being disposed proximal to sensors of a device under test (e.g., the touch sensors 202) and therefore may not involve actual contact in some instances. Further, although a single contact 206 is illustrated, these techniques may also be leveraged to support multiple contacts, such as to support multi-touch testing.

In the illustrated example, the contact 206 is illustrated as following a path 208 that is circular across the display device 110 that is detectable by the touch sensors 202. It should be readily apparent that although the path 208 is shown as being circular, other shapes are also contemplated including linear (e.g., back and forth movement), contact at a single point, and so on. Detection of the path 208 by the touch sensors 202 and subsequent processing by the touch module 204 is used to generate data 210 that is evaluated by the test module 114 to generate a report 212 that describes a result of the test.

A variety of different types of tests may be performed using the system 200. The test module 114, for instance, may generate a report 212 that describes latency of the device 104 in detecting and/or processing of the contact 206 by the touch sensors 202 and touch module 204. This may include measuring hardware latency of the device 104, end-to-end latency of the device 104 (e.g., to detect the contact 206 by the touch sensors 202 and subsequently process a corresponding input by the touch module 204), and so forth. In another instance, the test may include a measurement of accuracy of the device 104. This may include positional accuracy of the device 104 to measure a position on the display device 110 at which the contact 206 occurs. A variety of other examples of tests are also contemplated, further discussion of which may be found in relation to the following example.

Figure 3:
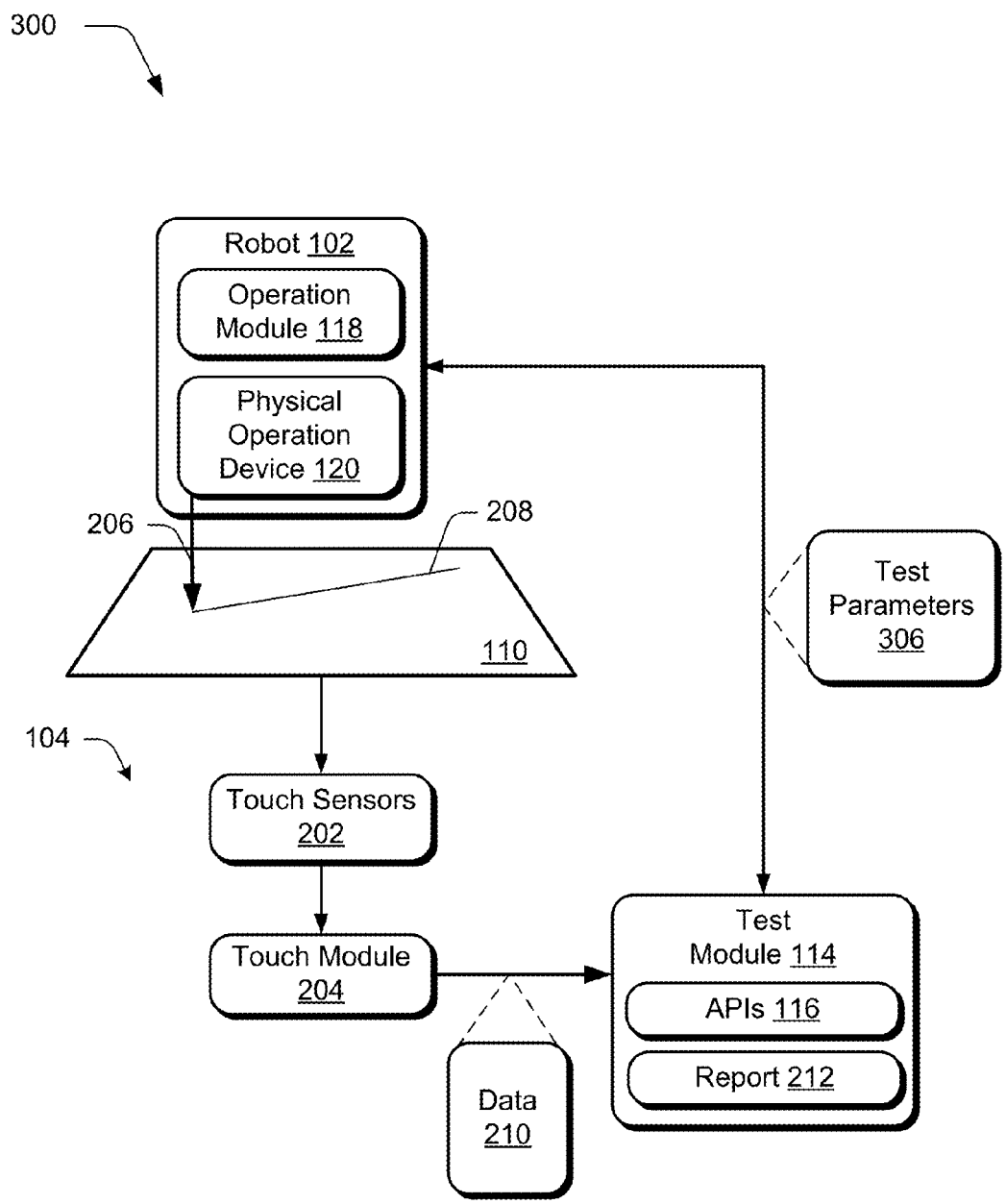
FIG. 3 depicts a system in an example implementation showing exposure of APIs by a device under test to a robot of FIG. 2 to perform a test.

FIG. 3 depicts a system 300 in an example implementation showing exposure of APIs by the device 104 under test to the robot 102 to perform a test. In this example, the test module 114 may be configured to initiate a "run" of tests, with each test designed to test a specific aspect of the device 104, such as to test hardware, software processing, touch sensors 202 located at different portions of the display device 110, and so forth. For example, the run of tests may be configured to mimic gestures that are recognizable by the device 104, such as a tap gesture, panning gesture, and so on. The tests may include operations performed by the robot 102 in response to test parameters 302 exposed via the APIs 116 of the test module 114 of the device 104 under test. The test parameters 302, for instance, may include randomized parameters such that even though a movement remains the same, a start and end point of the movement is changed. Further, the tests may be repeated a number of times as desired to collect data for testing.

A test and/or "test run" may be initiated in a variety of ways, such as by the test module 114 itself, from another device (e.g., a computing device that is in communication with the robot 102 and the device 104), and so forth. In response, the test module 114 may be made ready to communicate with the operation module 118 of the robot 102.

The operation module 118 of the robot 102 may then query the test module 114 for tests and corresponding operations to be performed by the physical operation device 120 of the robot 102 as part of the tests. The test module 114 and the operation module 118 of the robot 102 may then communicate to initiate a test. The test, for instance, may involve mimicking a gesture and thus the operation module 118 may query the test module 114 via the APIs 116 for a gesture object, which is then verified by the operation module 118. The operation module 118 may then cause the physical operation device 120 to perform the gesture described by the gesture object, such as to move the contact 206 along a path 208 that is generally linear to mimic a panning gesture as illustrated, may specify an acceleration profile (e.g., speed at different points of the gesture), and so on.

In response, the touch sensors 202 of the display device 110 may detect the movement of the contact and the touch module 204 may process the inputs to recognize the gesture. Results of this recognition may be communicated to the test module 114 as data 210 for processing as part of the test, such as to determine accuracy of location detection, measure latency (e.g., hardware and/or end-to-end latency), and so forth. This process may be repeated, such as to move on to another test as part of the run, repeat this test a predefined number of times, and so forth.

Accordingly, the test module 114 may support a variety of different APIs 116. These may include APIs 116 to query a current version and state of the test module 114. Other APIs 116 may relate to information regarding the tests, such as which tests are available, APIs to start and exits tests, status of the tests, and so forth.

The APIs 116 may also support interaction objects, which define interactions (e.g., a gesture) expected as part of a test for the device 104 to pass the test, an example of which is as follows:

```
interface IInteractionObject : IDispatch {
    HRESULT SetParameter(
        [in] BSTR name,
        [in] VARIANT value);
    HRESULT GetParameter(
        [in] BSTR name,
        [out] VARIANT* value);
}
```

The robot 102, for instance, may look at the interaction name and properties to determine which movements are involved in the test.

The following is an example of parameters that may be involved in testing gestures.

| Name | Type | Description |
|---|---|---|
| id | ULONG | The interaction id, this is reset to 0 at the start of each test and increments for each interaction. |
| interactionType | BSTR | The type of the interaction, e.g., tap, arc, line, and so one. The interactionType defines how to get from each startpoint to each endpoint, and gives the intent of the interaction object. |
| count | ULONG | The number of contacts in each array |
| xFrom | DOUBLE* (Array of count length) | Gives each start X position with the origin in the top left of the screen, and the positive axis running to the right and down. Note that start x and y positions may be negative, representing points on the device bezel, such as to perform an edge test. |
| xTo | DOUBLE* (Array of count length) | Gives each end X position |
| yFrom | DOUBLE* (Array of count length) | Gives each start Y position |
| yTo | DOUBLE* (Array of count length) | Gives each end Y position |
| startTimes | DOUBLE* (Array of count length) | Gives each start offset. The offset counts up from an arbitrary 0, the test module may be configured to wait indefinitely for input. |
| endTimes | DOUBLE* (Array of count length) | Gives each end offset (from 0) in ms. (Thus - the duration of a contact is given by endTimes[contact] - startTimes[contact]) Contact speed may be calculated from startTime/endTime and startPosition/endPosition. |
| rotation | DOUBLE* (Array of nContacts) | Gives the amount of rotation in radians from start to end, moving clockwise from start to end. |
| xCenter | DOUBLE | Gives the x center point to rotate around for circle and arcs |
| yCenter | DOUBLE | Gives the y center point to rotate around for circle and arcs |
| zDistance | DOUBLE* | Gives the distance from the screen a contact should remain. Note this represents the distance for an average human finger. For a robotic finger - the robot should adjust this height with respect to the difference in capacitance (if any.) |
| accelerationProfile | ULONG | Identifies the acceleration profile expected. |

In some instance, more than one interaction type may cover an interaction that is performable by the robot 102, e.g., a tap may be performed as part of a line gesture type. Accordingly, the test module 114 may expose a type having greater specificity to hint at an intent of the test, examples of which are described in the following table:

| Name | Description | Notes |
|---|---|---|
| FiveContactsDown | Five contacts down at a time | x/y start positions == x/y end positions count == 5 endTimes represents a minimum time Rotation, xCenter, yCenter, zDistance, accelerationProfile |
| Tap | A [set] of quick down up motions | x/y start positions == x/y end positions Rotation, xCenter, yCenter, zDistance, accelerationProfile |
| Line | A [set] of non-intersecting lines | Rotation, xCenter, yCenter, zDistance, accelerationProfile |
| Rotate | A [set] of circular arcs | xTo, yTo, zDistance, accelerationProfile |
| Hover | Hold contacts above the screen without touching | rotation, xCenter, yCenter, accelerationProfile |

-continued

| Name | Description | Notes |
|---|---|---|
| DoubleTap | Double tap | count == 2<br>startTimes[1] > endTimes[0]<br>rotation, xCenter, yCenter,<br>zDistance, accelerationProfile |
| Zoom | Diverging or converging non-intersecting lines | rotation, xCenter, yCenter,<br>zDistance, accelerationProfile |
| Rearrange | One stationary contact, one moving contact | rotation, xCenter, yCenter,<br>zDistance, accelerationProfile |
| TouchKeyboard | Multiple taps, linearly offset from one another | rotation, xCenter, yCenter,<br>zDistance, accelerationProfile |
| Non-Interaction | No interaction | Count == 1<br>endTimes[0] gives the length of time to not perform an interaction.<br>Rotation, xCenter, yCenter, zDistance, xFrom, yFrom, xTo, yTo, accelerationProfile |
| Toss | A single line with a defined accelerationProfile. | Count == 1<br>rotation, xCenter, yCenter, zDistance |

Example Procedures

The following discussion describes testing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-300 of FIGS. 2 and 3, respectively.

Figure 4:
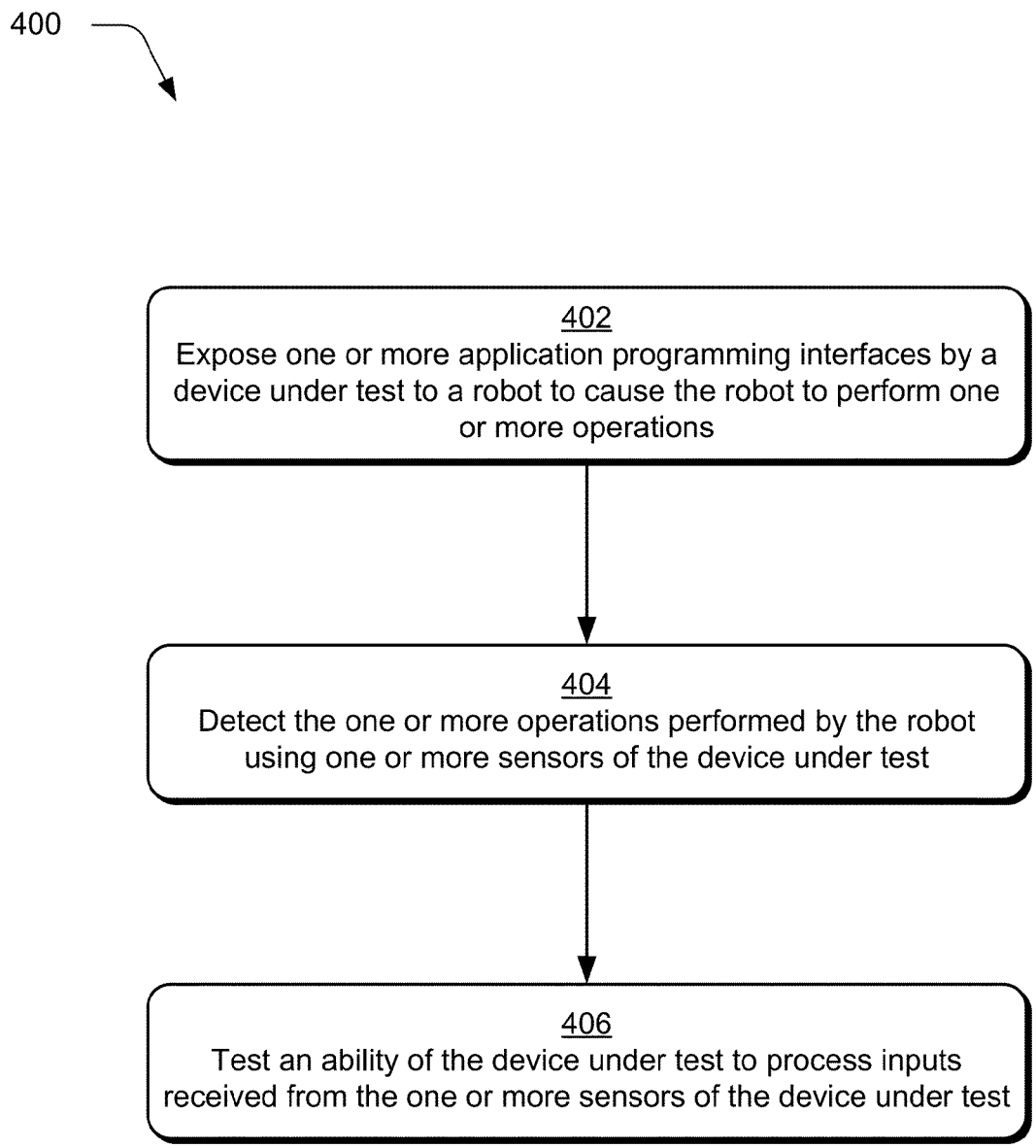
FIG. 4 is a flow diagram depicting a procedure in an example implementation in which operations of a robot are detected by a device under test to test the device.

FIG. 4 depicts a procedure 400 in an example implementation in which operations of a robot are detected by a device under test to test the device. One or more application programming interfaces are exposed by a device under test to a robot to cause a robot to perform one or more operations (block 402). The device 104, for instance, may expose APIs 116 to provide test parameters 306 that are to be used by the robot 102 to perform the one or more operations, such as a tap, pan gesture, and so on.

The one or more operations performed by the robot are detected using one or more sensors of the device under test (block 404). The device 104 may then utilize sensors 106 (e.g., touch sensors) to detect proximity of the contact 206 employed by the physical operation device 120 of the robot 102.

An ability of the device under test is tested to process inputs received from the one or more sensors of the device under test (block 406). The test module 114, for instance, may receive data 210 from the touch module 204 and use this data 210 in conjunction with the test parameters 306 to test the device 104. As previously described, a variety of different tests may be performed, such as positional accuracy, latency, and so forth.

Figure 5:
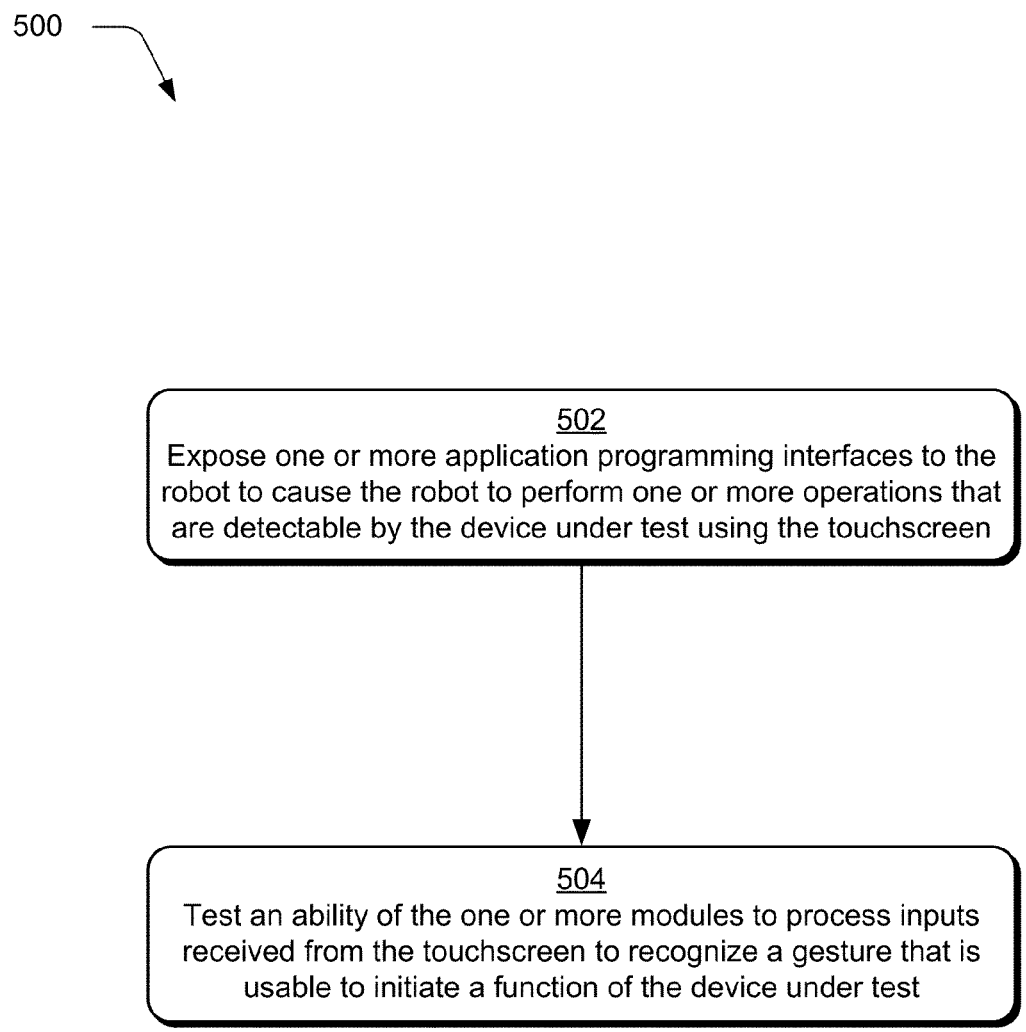
FIG. 5 is a flow diagram depicting a procedure in an example implementation in which a device under tests exposes one or more application programming interfaces and uses a robot to test the device.

FIG. 5 depicts a procedure 500 in an example implementation in which a device under tests exposes one or more application programming interfaces and uses a robot to test the device. One or more application programming interfaces are exposed by a device under test to the robot to cause the robot to perform one or more operations that are detectable by the device under test using the touchscreen (block 502). As before, the device 104 may expose APIs to the robot 102 to cause operations to be performed. In this instance, the operations are configured to mimic gestures that are recognizable by the device 104 to initiate one or more functions of the device 104.

An ability of the one or more modules to process inputs received from the touchscreen is tested to recognize a gesture that is usable to initiate a function of the device under test (block 504). The test module 114, for instance, may expose a plurality of different gesture objects to test an ability of the device 104 to recognize gestures. In this way, suitability of the device 104 to operate as intended may be determined through leveraging the device itself.

Example System and Device

Figure 6:
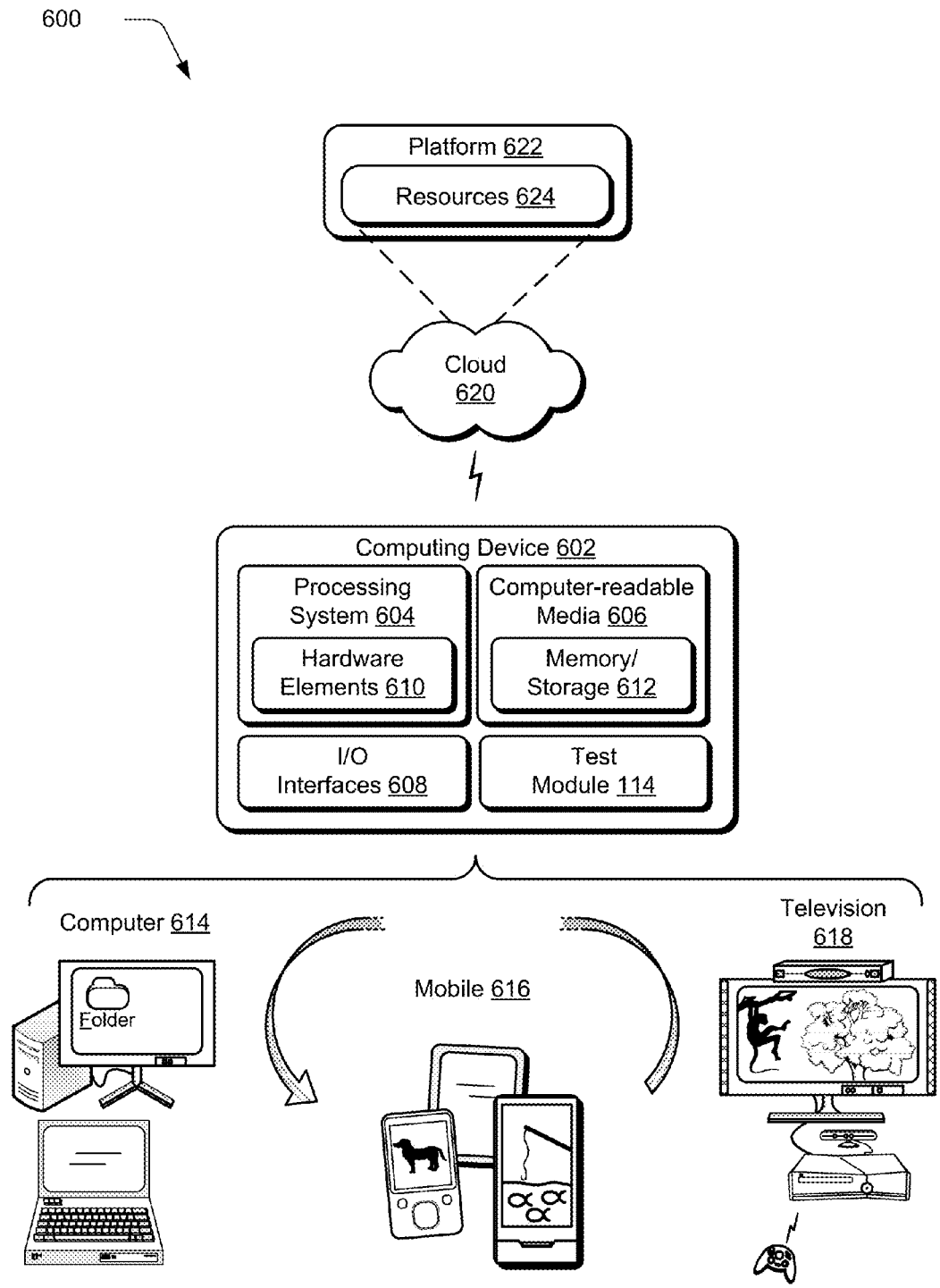
FIG. 6 illustrates an example system including various components of an example device that can be implemented as any type of computing device as described with reference to FIGS. 1-3 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein in relation to the test module 114 and even the device under test may be supported by these various configurations of the computing device 602 and are not limited to the specific examples of the techniques described herein. This functionality of the test module 114 may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
   a housing;
   one or more sensors supported by the housing; and
   one or more modules disposed within the housing that are implemented at least partially in hardware, the one or more modules configured to test the one or more sensors by:
      processing inputs detected using the one or more sensors under test; and
      exposing one or more application programming interfaces to a robot to cause the robot to perform one or more operations that are detectable by the one or more sensors under test, the one or more operations usable to test detection performed by the one or more sensors and the processing of the inputs performed by the one or more modules under test.

2. A device as described in claim 1, wherein the one or more application programming interfaces are configured to specify movement of a contact that is to be performed by the robot, the movement detectable by the one or more sensors.

3. A device as described in claim 2, wherein the movement is configured to imitate a gesture that is recognizable by the one or more modules through the processing of the inputs, recognition of the gesture configured to initiate a function that is performable by the one or more modules.

4. A device as described in claim 1, wherein the one or more sensors are part of a touchscreen device and the device is configured as a computing device.

5. A device as described in claim 4, wherein the computing device is configured as a mobile phone or a tablet computer.

6. A device as described in claim 1, wherein the testing is configured to measure location accuracy of the one or more operations performed by the robot.

7. A device as described in claim 1, wherein the testing is configured to measure latency of the device in recognizing movement or contact of the one or more operations performed by the robot.

8. A device as described in claim 1, wherein the testing is configured to measure hardware latency of the device in recognizing the one or more operations performed by the robot.

9. A device as described in claim 1, wherein the testing is configured to measure end-to-end latency of the device in recognizing the one or more operations performed by the robot.

10. A device as described in claim 1, wherein the one or more modules are configured to perform the test.

11. A device as described in claim 1, wherein the one or more sensors of the device are configured to detect the one or more operations as involving a contact of the robot as disposed as at least proximal to the one or more sensors.

12. A device as described in claim 1, wherein the one or more sensors are configured as a touch sensor, infrared sensor, optical imaging sensor, dispersive signal sensor, sensor in pixel, resistive sensor, or acoustic pulse recognition sensor.

13. A method comprising:
   expose one or more application programming interfaces by a device under test to a robot to cause the robot to perform one or more operations;
   detecting the one or more operations performed by the robot using one or more sensors of the device under test; and
   testing an ability of the device under test to process inputs received from the one or more sensors of the device under test.

14. A method as described in claim 13, wherein the one or more operations are configured to imitate one or more gestures that are recognizable by the device under test to initiate one or more functions performable by the device under test.

15. A method as described in claim 13, wherein the testing is configured to measure latency.

16. A method as described in claim 15, wherein the latency involves detection of contact or movement by the one or more sensors.

17. A method as described in claim 15, wherein the one or more sensors are configured as part of a touchscreen of the device under test.

18. A system comprising:
   a robot configured to perform one or more operations; and
   a device under test having a touchscreen and one or more modules that are implemented at least partially in hardware to:
      expose one or more application programming interfaces to the robot to cause the robot to perform one or more operations that are detectable by the device under test using the touchscreen; and test an ability of the one or more modules to process inputs received from the touchscreen to recognize a gesture that is usable to initiate a function of the device under test.

19. A system as described in claim 18, wherein test performed by the one or more modules of the device under test involves measuring latency of the device under test to recognize the gesture.

20. A system as described in claim 18, wherein test performed by the one or more modules of the device under test involves measuring accuracy of the touchscreen of the device under test.

* * * * *